US011455479B1

(12) United States Patent
Chornenky et al.

(10) Patent No.: US 11,455,479 B1
(45) Date of Patent: Sep. 27, 2022

(54) INTELLIGENT MULTIPLE ANTENNA AND RADIO INTERCONNECT OPTIMIZER AND METHOD

(71) Applicant: NOKOMIS, INC., Canonsburg, PA (US)

(72) Inventors: Todd Eric Chornenky, Carmichaels, PA (US); David J. Kania, Pittsburgh, PA (US)

(73) Assignee: NOKOMIS, INC., Canonsburg, PA (US)

( * ) Notice: Subject to any disclaimer, the term of this patent is extended or adjusted under 35 U.S.C. 154(b) by 0 days.

(21) Appl. No.: 17/315,786

(22) Filed: May 10, 2021

(51) Int. Cl.
  *G06K 7/10* (2006.01)
  *G06K 19/07* (2006.01)
  *H01Q 1/24* (2006.01)

(52) U.S. Cl.
  CPC ..... *G06K 7/10366* (2013.01); *G06K 19/0723* (2013.01); *H01Q 1/24* (2013.01)

(58) Field of Classification Search
  CPC ... G06K 7/10366; G06K 19/0723; H01Q 1/24
  See application file for complete search history.

(56) References Cited

U.S. PATENT DOCUMENTS

| 2007/0279286 | A1* | 12/2007 | Coutts | H01Q 9/0442 343/700 MS |
| 2010/0079347 | A1* | 4/2010 | Hayes | H01Q 3/2682 343/705 |
| 2010/0259364 | A1* | 10/2010 | Man | G06K 7/0008 340/10.1 |
| 2013/0154761 | A1* | 6/2013 | Ilkov | H04B 1/0057 333/175 |
| 2013/0154804 | A1* | 6/2013 | Jung | G06K 7/10356 340/10.1 |
| 2014/0227982 | A1* | 8/2014 | Granger-Jones | H04B 1/006 455/77 |
| 2017/0064570 | A1* | 3/2017 | Shen | H04B 15/00 |
| 2021/0058167 | A1* | 2/2021 | Sheehe | G06V 20/52 |

OTHER PUBLICATIONS

Trim Neat Feet 2-in-1 Buffer & Sole Refiner Foot File.
S-Line Emery Foot File F3 Series.

* cited by examiner

*Primary Examiner* — Omer S Khan
(74) *Attorney, Agent, or Firm* — AP Patents; Alexander Pokot

(57) ABSTRACT

An intelligent multiple antenna and radio interconnect optimizer includes an antenna port suitable for a connection to an antenna, a radio port suitable for a connection to a radio, a machine readable identifier coupled to one of the antenna port, the radio port and a combination thereof, the machine readable identifier suitable to identify a feature in each of a radio being connected to the radio port and an antenna being connected to the antenna port, a radio frequency (RF) switch configured to connect the antenna port with the radio port in a response to a connection permission signal from the machine readable identifier when the feature in the radio matches the feature in the antenna, and a controller configured to receive antenna and radio port location inputs from the machine readable identifier, and control operation of the RF switch.

19 Claims, 8 Drawing Sheets

INTELLIGENT MULTIPLE ANTENNA AND RADIO INTERCONNECT OPTIMIZER AND METHOD

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to antenna radio communication. The subject matter may be related to distributing communication between selected antenna and radio pair. The subject matter may be related to interconnect and distribution control of the communication between multiple antennas and radios.

BRIEF DESCRIPTION OF THE DRAWINGS

The accompanying drawings are incorporated in and constitute part of the specification and illustrate various embodiments. In the drawings.

DETAILED DESCRIPTION

Figure 1:
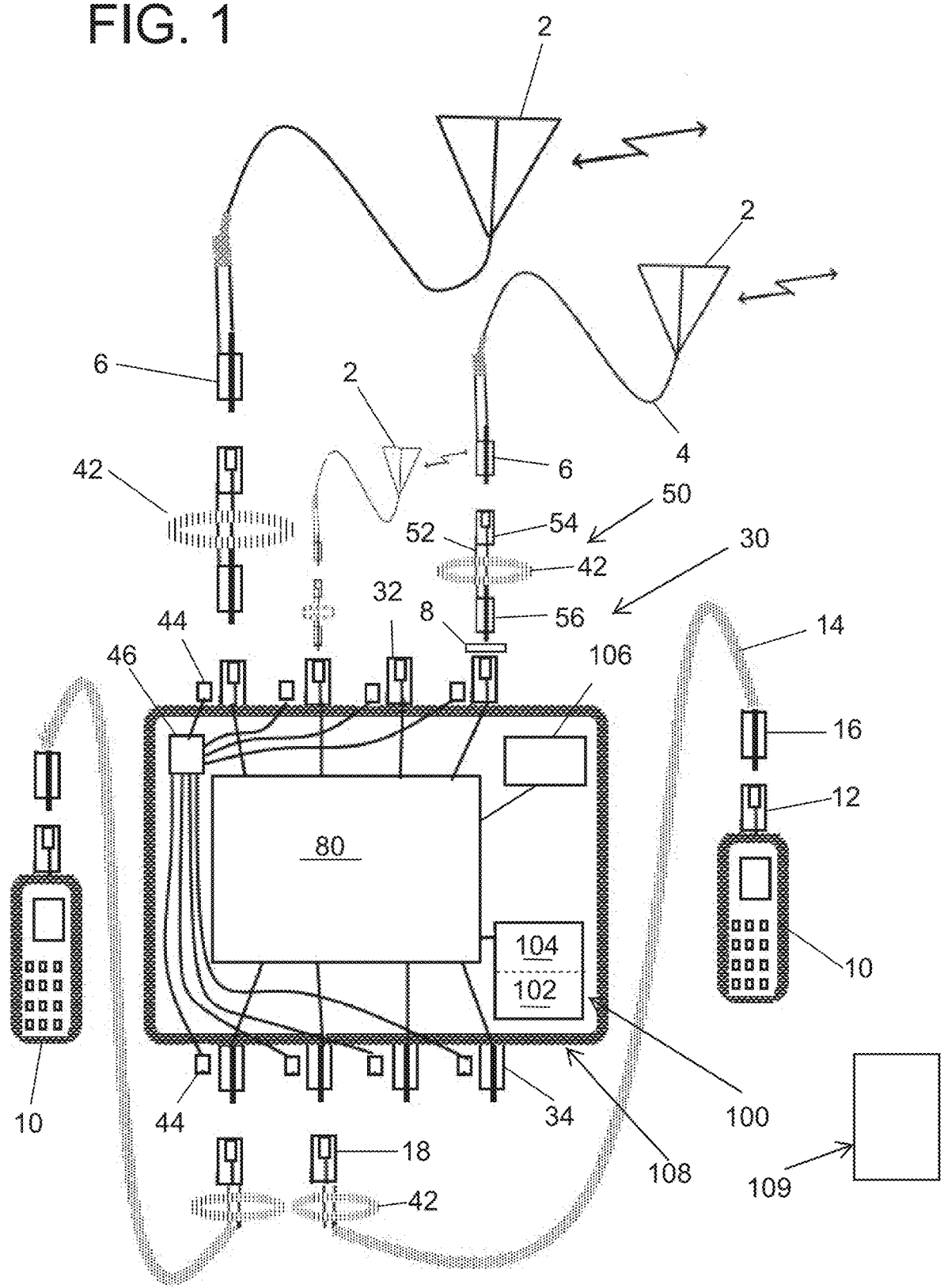
FIG. 1 illustrates a block diagram of an intelligent multiple antenna and radio interconnect optimizer.

Prior to proceeding to the more detailed description of the present subject matter, it should be noted that, for the sake of clarity and understanding, identical components which have identical functions have been identified with identical reference numerals throughout the several views illustrated in the drawing figures.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

For purposes here, the words "comprising," "including," "having," and variants thereof, wherever they appear, shall be construed as open-ended terminology, with the same meaning as if the phrase "at least" were appended after each instance thereof.

The verb "may" is used to designate optionality/noncompulsoriness. In other words, something that "may" can, but need not.

Before elucidating the subject matter shown in the Figures, the present disclosure will be first described in general terms.

Due to the variety and criticality of antennas in radio frequency (RF) systems, antennas have evolved into optimized specialized designs distributed in multiple locations to fulfill their mission. In areas where many RF systems are used, multiple antennas may adversely interact with each other in their electromagnetic response or may simply duplicate the function of nearby antennas exacerbating the crowding problem. Antenna capabilities may be used in acquiring warfighter intelligence collection, surveillance, and reconnaissance (ISR) using a range of receiver platforms, requiring agility in frequency, bandwidth, gain, directionality, polarization, and durability. Further, switching antennas between radios (transceivers) is a time-consuming task and mistakes can cause equipment damage if done incorrectly due to improper impedance matching and resulting reflected power. The rapid configuration and operability of these resources may make the difference between application success and application failure. Accordingly, an automation and distribution control of these resources may be needed, especially if a flexible retrofit arrangement utilizing existing antenna and transceiver resources may be also achieved.

Disclosed herein is intelligent multiple antenna and radio interconnect optimizer, hereinafter referred to as a device, that is designed with an antenna port, a radio port, a machine readable identifier, a sensor, a sensor controller, a radio frequency (RF) switch, and a controller. Thus, the device is designed to selectively establish or distribute a communication between a radio and an antenna. The device may be designed to selectively establish or distribute a communication between a plurality of radio and antenna pairs. The device may be designed to selectively establish or distribute a communication between a single radio and a plurality of antennas. The device may be designed to selectively establish or distribute a communication between a plurality of radios and a single antenna.

Either one of the radio and the antenna may be connected by way of a cable. The cable connection in communication with the device may be referred to as a dongle. The radio may be any radio designed to transmit and receive RF communication. The radio may be referred to as a transceiver if it is designed to receive and transmit RF communication.

The antenna type may be one of a monopole antenna, a dipole antenna, a yagi antenna, a dish antenna, a horn antenna, a log periodic antenna, a loop antennas, off-center fed dipole (OCFD) antenna, a spiral antenna, a coil antenna, and any combination thereof.

The antenna port is suitable for a connection to an antenna. The antenna port may be provided as a connector. The connector may be any one of SMA connector, BNC connector, N-type connector, SMB connector, and MCX connector. The antenna port (connector) functions to provide antenna input to RF switch and to the controller. The antenna port (connector) functions to input the radio RF signal from the antenna into the device so that it can be passed to the radio through the RF switch. The antenna port may also function to supply RF and/or other forms of electrical power to the connected antenna. The antenna port (connector) also functions to output an RF signal transmitted from the radio through the RF switch. When a plurality of antenna ports is provided, the ports may be of a different type. Some RF ports and associated switches (to be described later in this document) may be selected to be able to pass and interconnect a higher RF power level to accommodate radios capable of transmitting at higher RF power levels being connected to antennas also capable of transmitting at higher power levels.

The radio port is suitable for a connection to a radio. The radio port may be provided as a connector. The connector may be any one of SMA connector, BNC connector, N-type connector, SMB connector, and MCX connector. The radio port (connector) functions to input the radio RF signal into the device so that it can be passed to the antenna through the RF switch. The radio port may also function to supply power to the connected radio. The radio port (connector) also functions to output an RF signal received from the antenna through the RF switch. Because, the radio may be the transceiver, the radio port may be referred to as a transceiver port. When a plurality of radio ports is provided, the ports may be of a different connector type.

The radio port is suitable for a connection to a radio. The radio port may be provided as a connector. The connector may be aby one of SMA connector, BNC connector, N-type connector, SMB connector, and MCX connector. The radio port and/or the antenna port may comprise a high frequency connector. The high frequency connector may be designed to handle millimeter waves and terahertz frequencies. The radio port and/or the antenna port may also comprise a wave guide.

The radio port may be identical to the antenna port. The radio port may be of a different type then the antenna port. In either configuration, the radio port is designed to pass RF and other signals to the radio and receive RF and other signals therefrom and antenna port is also designed to pass RF and other signals to the radio and receive RF and other signals therefrom. In either configuration, the connector (port) comprises pins or sockets. The connector may be an adapter with keyed features to key only to a particular mating connector.

The radio port may be used to convey transmitted RF power from the radio or transceiver over to an antenna port and its connected antenna via am RF switch matrix (to be described later in this document).

The machine readable identifier is coupled to one of the antenna port, the radio port and a combination thereof. The machine readable identifier is suitable to identify a feature in each of a radio being connected to the radio port and an antenna being connected to the antenna port. The machine readable identifier may be a code which is associated with a class of the radio or the antenna, the class' detailed characteristics or specifications being cross referenced or contained in a database or look-up table in the controller to better determine an appropriate, allowed, or optimal connection match.

The machine readable identifier may include a radio frequency identification (RFID) tag. The RFID tag may be coupled to the antenna. The RFID tag may be securely attached to the antenna. The RFID tag may be securely attached to the cable extending from the antenna. The RFID tag may be mounted within an RF connector connected to one of the antenna and the antenna cable. The RFID tag may be coupled to the radio. The RFID tag may be securely attached to the antenna cable near the antenna connector connected to the antenna port. The RFID tag may be securely attached to the radio. The RFID tag may be securely attached to a cable extending from the radio.

The machine readable identifier may include a barcode (or similar written code). The barcode may be provide as a printed label. The barcode may be coupled to the antenna. The barcode may be securely attached to the antenna. The barcode may be securely attached to the cable extending from the antenna. The barcode may be mounted within an RF connector connected to one of the antenna and the antenna cable. The barcode may be coupled to the radio. The barcode may be securely attached to the radio. The barcode may be securely attached to a cable extending from the radio.

A sensor is provided to sense one of the RFID tag and a barcode.

When machine readable identifier is provided as the RFID tag, the sensor is designed as RFID reader. The RFID reader queries the RFID tag and receives information therefrom. The RFID reader may be a sensor. The RFID reader may be positioned adjacent and external to the antenna port in a position to read the RFID tag. The RFID reader may be mounted within the antenna port. The RFID reader may be positioned adjacent and external to the radio port in a position to read the RFID tag. The RFID reader may be mounted within the radio port.

A sensor controller is also provided. When the sensor is provided as RFID reader, the controller may be referred to as RFID controller. RFID controller is electrically connected to the RFID reader and is designed to receive information (signal) from the RFID tag through the RFID reader and output this information (signal) to the controller. The RFID controller may be positioned within a housing of the device and designed to read a plurality of RFID tags through a plurality of RFID readers. The components and function of the RFID controller may be integrated into the controller.

When machine readable identifier is provided as the barcode, the sensor is designed as barcode reader.

The barcode reader is designed to read the information on the barcode. The barcode reader may be a sensor. The barcode reader may be positioned adjacent and external to the antenna port in a position to read the barcode. The barcode reader may be mounted within the antenna port. The barcode reader may be positioned adjacent and external to the radio port in a position to read the barcode. The barcode reader may be mounted within the radio port.

When the sensor is provided as the barcode reader, the controller may be referred to as a barcode controller. The barcode controller is electrically connected to the barcode reader and is designed to receive information from the barcode tag through the barcode sensor and output this information to the controller. The barcode controller may be positioned within a housing of the device and designed to read a plurality of barcodes through a plurality of barcode readers. The components and function of the barcode controller may be integrated into the controller.

The machine readable identifier may be provided as a component of an adapter for antenna, including a physical adapter configured and shaped as a semi-unique 'key' to prevent physical connection with incompatible ports. This adapter may be further designed with a housing and two connectors. Each connector is accessible from an exterior surface of the housing. The machine readable identifier may be disposed on an exterior surface of the housing. The machine readable identifier may be disposed within an interior of the housing. Each connector may be provided as a male RF connector. Each connector may be provided as a female RF connector. One connector may be provided as the male RF connector and the other connector may be provided as the female RF connector. This adapter may be securely attached and/or locked to the antenna cable to eliminate an inadvertent separation of the adapter from the antenna cable.

The sensor controller may be provided as a network analyzer suitable to identify the antenna being connected to the antenna port and/or antenna characteristics. Such network analyzer may be mounted within the housing.

The machine readable identifier may be designed as a circuit. The circuit may include a first wire having one end thereof being attached to a shield of a connector and a second end thereof being connected to an antenna and/or radio, a second wire having one end thereof being attached to a center RF pin of the connector and a second end thereof being connected to one of the antenna and the radio, a capacitor disposed within one of the first and second wires, a resistor electrically connected to each of the first and second wires, a value of the resister being selected to match of a unique antenna and/or a unique radio, and a coil electrically connected, in a series with a resistor as an a RF choke, to each of the first and second wires. As a non-limiting example, resistor may be 20K ohms to designate antenna type/model A whereas other resistance values such as 40K ohms, 50K ohms, etc. may designate other antenna types/models. The circuit may be referred to as an identification circuit as it is designed to identify a type of the antenna and/or radio.

The machine readable identifier may designed as an circuit including a first wire having one end thereof being attached to a shield of a connector and a second end thereof being connected to an antenna, a second wire having one end thereof being attached to a center pin of the connector and a second end thereof being connected to the antenna and/or the radio, a capacitor disposed within one of the first and second wires, a first branch electrically connected to each of the first and second wires, the first branch having a first resistor, a first diode and a coil mounted in a series with each other, a second branch electrically connected at one end thereof to one of the first and second wires and electrically connected at a second end thereof to the first branch mediate the first diode and the coil, the second branch having a second resistor and a second diode being mounted in a series with each other, and a value of each of the first and second resisters being selected to designate a unique antenna model/type and/or a radio model/type.

When the machine readable identifier is designed as the above described circuit, the sensor will be adapted with a meter configured to measure a direct current (DC) resistance of the circuit. Such sensor may be an ohmmeter. Same or a different sensor may be provided within the device to measure DC resistance of the RF switch contact. Continuous low resistance may indicate a continuously closed state of the contact due a stuck or welded. High resistance may indicate a continuously open state of the contact due to contamination on and/or degradation of contact surfaces.

The RF switch is configured to connect the appropriate or optimal antenna port with the radio port in a response to a control signal when a feature in the radio matches a feature in the antenna.

The RF switch may comprise an RF microelectromechanical system (MEMS) switch. The RF switch may comprise a plurality of MEMS switches. MEMS switches are light weight and are associated with a low power. General design of the MEMS RF Switch also uses micromachining technology. Micromachining allows a hermetically sealed chamber to be easily manufactured to prevent any oxidation of the metal switch contact. The metal switch contacts are sufficiently thick to allow for substantial power flow, yet thin enough to allow a simple cantilever design to act as a contact return spring with minimal fatigue in the metal switch contact. MEMS RF Switch is associated with a precision control of the metal parts in a sealed environment, which allows relatively smaller activation force to close electrical contacts with otherwise a high dielectric/insulation gap. This force may be generated using electrostatics rather than the traditional electromagnetic coils with an enormous saving in operating power and heat generation.

Each MEMS switch may be provided with a plurality of contacts that can be individually closed or open by a control signal from the controller. Contacts of the plurality of MEMS switches may be electrically connected with each other in an array form. The array form may be referred to as a matrix. The plurality of MEMS switches in the matrix may be selected and controlled through a single Serial Peripheral Interface (SPI).

This matrix-system may operate continually in a variety of RF backgrounds and in the environments of forward-operating bases. Thus, particular attention must be paid to ruggedization when developing the hardware. The switch matrix may perform its switching function with a minimum of loss to the signal being switched.

MEMS switch matrix flexibility may be leveraged to perform such things as dynamically adaptable bandpass filtering using ultra-low noise passive hardware, switching in circuits to automatically identify antenna placement on RF output ports, and similarly automatically identify transceiver placement on switching matrix ports.

Furthermore, one or more MEMS switches will be used to receive an input from one or more antennas. This MEMS switch may be referred to as an antenna switch. One or more MEMS switches will be used to receive an input from the radio. This MEMS switch may be referred to as a radio switch. In this matrix form, each contact in each antenna switch is electrically connected to one or more contacts in the radio switch. Similarly, each contact in the radio switch is electrically connected to one or more contacts in the antenna switch. Each contact is also electrically connected to the controller.

MEMS switches for antenna selection may offer sub-millisecond antenna selection, antenna sharing, and potentially more exotic capabilities such as combining signals from omnidirectional antennas with high-gain directional antennas focused on critical areas of interest for multiple receivers and future signal cancellation from interferers. Capabilities may include dynamic prefilters to automatically cancel interferers. Current MEMS switch technology needs a relatively high voltage to turn them on. A typical operating voltage may be on the order of 80 VDC. MEMS switches of different power, voltage and/or different current may be employed within the switch matrix. MEMS switches will be sized relative to the power of radios and/or antennas. Accordingly, radios of different types may be used with a single switch matrix. The ON-TIME of each MEMS switch may be thus monitored and recorded. Multiple MEMS switches may be selected and controlled through a single Serial Peripheral Interface (SPI) serial interface. This allows for easy expansion of the number of channels in the device by simply adding one or more additional boards, including their associated switching boards.

Number of MEMS switches in the matrix depends on the number of radios and antenna expected to be connected to each other, the MEMS switch design and the number of contacts in each switch. When MEMS switch is designed with four single pole contacts, two MEMS switches may be used, one for each of the antenna port and the radio port. As an example, eight MEMS switches with thirty-two single pole contacts are used in a matrix configured to accommodate four radios and four antennas. When MEMS switch is designed with one contact, thirty two MEMS switches are used in in a matrix configured to accommodate four radios and four antennas.

Non-MEMS RF switches may be used to construct the matrix. A combination of MEMS RF switches and non-MEMS RF switches may be used. MEMS switches typically provide lower size, weight and low control power draw used to switch them. Non-MEMS RF switches may provide a higher power handling capacity.

The controller is configured to receive antenna and radio port location inputs from the sensor controller, and output the control signal to control operation of the RF switch. The controller may be also designed to interface with a remote control unit. The controller may be designed to select and control MEMS switches through the SPI. The controller may be designed to select and control MEMS switches through dedicated logic output control lines, foe for example such as 3.3V level CMOS logic lines. The control signal from the controller opens or closes a selected contact from the plurality of contacts. The controller also functions to open or close antenna switch contact(s) and the radio switch contact(s) so as to respectively establish or terminate RF communication between a radio and an antenna with matching features. The controller may also be designed to monitor the system to verify communications with all the RF Switches and indicate any concerns about the aging of RF switches. The controller may also be configured manually using a human-operable means such as a graphical user interface or voice commands such as stating "connect radio PRC-150 to the 14 Megahertz antenna".

When one radio is to be used with two antennas, the controller is programmed to establish RF communication between the radio and two antennas, where one radio can at least receive RF communication from each antenna. Receive-only antenna ports may especially have an LNA attached to them to amplify the received signal and isolate the antennas from the switch matrix to a degree.

When machine readable identifier indicates acceptable radio and antenna pair, a radio port location and an antenna port location are received at the controller from the sensor controller. In a response to the received port antenna and radio locations, the controller selects/matches the MEMS switches to such radio and antenna pair. The controller then selects and closes, via a control signal, respective contacts within the switches to interconnect the radio with the antenna.

The antenna port(s), radio port(s), RF switch and controller may be mounted on a printed circuit board (PCB). These components may be electrically interconnected therebetween with wires and/or PCB traces. These components may be electrically interconnected therebetween with traces on the PCB. The controller may comprise one or more microprocessors and a memory, which is a non-transitory signal, having machine executable instructions stored thereon that when executed by the processor cause the one or more microprocessors to execute various operations.

When the device is to be made portable, the device may include a housing with a hollow interior. The RF switch and controller will be then mounted within the hollow interior. The housing may be referred to as an enclosure that encloses RF Switch and controller will be then mounted within the hollow interior. The housing may be referred to as a casing that encases RF switch and controller will be then mounted within the hollow interior. The antenna port(s) and the radio (ports) may be mounted for access from the exterior surface of the housing. The antenna port(s) and the radio (ports) may protrude past an exterior surface of the housing. The antenna port(s) and the radio (ports) may be mounted below the exterior surface of the housing, for example, in an interior compartment that is open to environment external to the housing.

The device may be adapted with a user interface. When used, the user interface is designed to enable the operator to monitor the status of the RF switch and troubleshoot any fault or potential switch failures. The user interface may include switches and/or alpha-numeric keys. The user interface may include any one of an indicator, a gage and a meter. The user interface may include a display. The display may be a touch screen. Thus, the user interface may be designed as a graphical user interface (GUI). The user interface may be protected with a cover when not in use. The controller may interface with the user interface by RF or infrared (IR). The controller may interface with the user interface by wires. The controller may interface by RF or IR with the remote control interface from a distance which can then be disconnected and used remotely if desired. The ID number of the device will then be entered in the user interface and the functionality and features of it will be available.

The device, as described above, may be adapted with a low noise amplifier (LNA). LNA may be mounted at an antenna input and/or connected to the RF switch. LNA may be selected by the controller as needed to boost signal.

The device, as described above, may be adapted with a filter. The filter may be mounted at an antenna port and/or connected to the RF switch. The filter is designed to allow insertion and selection of different frequency filters. The filter may be designed as one of a band-pass filter, a high-pass filter, a lowpass filter, and a notch filter.

The device, as described above, may be adapted with a protection on an antenna port to protect from lightening and/or voltage surges. The protection may include a diode.

The device may be adapted with a test capability to test operability/reliability of the MEMS switches. The test capability may be designed with a first test port configured to receive a test signal into the RF switch and a second port configured to output a test value from the RF switch in a response to the received test signal. Each of the first and second test ports may be a contact within a MEMS switch within the MEMS switch matrix. This MEMS switch may be referred to as a test MEMS switch. During test, the controller is configured to generate the test signal at one contact of the test MEMS switch, route the test signal through remaining contacts in remaining MEMS switches and to receive the test value from contact in another test MEMS switch. The test signal may be a DC voltage or DC current signal that may test MEMS switch even when the radio or the antenna is connected thereto.

Each of the first and second test ports may be a connector.

The device may be designed with a directional coupler mounted at one of the radio port and the antenna port.

The device may be designed with one of a signal splitter, a signal combiner and a combination thereof and attached to one or more antenna ports.

The device may include a remote controller, being of RF-based and infrared-based.

In view of the above a method of intelligently optimizing interconnect between an antenna and a radio may be achieved by enabling, with a machine readable identifier coupled to each of a radio frequency (RF) antenna and a radio and an RF switch connecting the antenna with the radio, an RF communication between the RF antenna and a radio in a response to a connection permission signal from the machine readable identifier when a feature in the radio matches a feature in the antenna.

In view of the above a method of intelligently optimizing interconnect between an antenna and a radio may be achieved by distributing, with a machine readable identifier coupled to a plurality of radio frequency (RF) antenna ports and a plurality of radio ports and an RF switch connecting the plurality of RF antenna ports with the plurality of RF radio ports, an RF communication between an RF antenna port and an RF radio port in a response to a connection permission signal from the machine readable identifier when a feature in a radio being coupled to the RF radio port matches a feature in an RF antenna being coupled to the RF antenna port.

As a non-limiting example, an HF transceiver and UHF transceiver may be connected to the radio ports and a HF antenna and UHF antenna may be connected to the antenna ports. The controller can then thus sense and properly route and interconnect using the switch matrix the HF transceiver to the HF antenna and the UHF transceiver to the UHF antenna automatically.

In view of the above, therein is disclosed a device that includes a housing, a male RF connector portion accessible from an exterior surface of the housing, a female RF connector portion accessible from the exterior surface of the housing, and an RF identifier mounted on the exterior surface of the housing or within a hollow interior of the housing. This device may be referred to as an adapter. The RF identifier may be a radio frequency identification (RFID) tag, as described above. The RF identifier may be a barcode as described above. The barcode may be provided as a label.

The RF identifier in the adapter may be a circuit, the circuit that includes a first wire having one end thereof being attached to a shield of a connector and a second end thereof being connected to an antenna, a second wire having one end thereof being attached to a center pin of the connector and a second end thereof being connected to the antenna, a capacitor serving as a DC block and disposed within one of the first and second wires, a resistor electrically connected to each of the first and second wires, a value of the resister being selected to match a unique antenna, a coil, serving as an RF choke, electrically connected, in a series with a resistor, to each of the first and second wires.

In view of the above, herein is disclosed an antenna assembly that includes a radio frequency (RF) antenna, a cable extending from the antenna, an RF connector secured to a distal end of the cable in an electrical connection with the antenna, and an antenna identifier, as described above. The antenna identifier may be integrated into the RF antenna connector. The antenna identifier may be mechanically coupled to the RF connector.

In view of the above, the antennas may be adapted with low insertion loss insertable dongles, identifying DC circuits, RF isolated by RF chokes and read by the switching system upon attachment. This allows for low cost and ease of retrofitting, similar to but smaller than an insertable filter at a connector end of the antenna. A similar arrangement may be used at the radio port uniquely identifying the make and model of the radio.

In view of the above, the radio employed may be easily retrofitted with an identifying dongle at their antenna connection which then identifies their frequency to the RF Switch and to the controller and transmits RF characteristics, that may include mission objectives. This information may then be used to automatically configure the array by the GUI.

In view of the above, the dynamically and automatically reconfigurable antenna connection concepts may quickly and invisibly establish communications through any connected RF system.

A pre-filter may be designed with MEMS switches to prevent front-end saturation, aliasing, and improve overall Signal to Noise Ratio (SNR) of the RF signal. The pre-filter may be referred to as a RF bandpass filter. RF bandpass filter improves transceiver operation in multi-transceiver, multi-antenna environments where one radio is transmitting on one frequency and another radio is receiving on a nearby adjacent frequency.

An RF power overload protection may be used when two or more radios are to be connected to one antenna and when either or any such radio is used in a receive mode usually or sporadically in a transmit mode. The cable or dongle for these radios may be adapted with a switching circuit to dump any RF power through a dummy load resistor to the shield should either radio be used for transmit. The circuit may be designed to connect the RF pin to the shield with a dummy load resister and two diodes, where diodes are electrically connected in parallel with each other and further connected in series with the dummy load resister. Then, a substantial portion of RF power from a transmit attempt by the user will be dumped into the shield of the dongle thru the dummy load resistor, substantially protecting the receiving radios from a substantial portion of the RF transmit power long enough to prevent damage. An annunciator or audible beeper may be used to warn of the anomalous transmit condition, allowing the user to cut short the transmission earlier, further reducing likelihood of damage to receiver or transmitter. The annunciator may preferably harvest the RF energy from the transmission to power the audible signal.

This circuit may be further enhanced to measure standing wave ration (SWR) return and alarm if transmitting when a preset SWR threshold is exceeded, thus protecting the transmitter by alarming the user. The SWR may be exceeded if an antenna is malfunctioning or misconfigured.

The overload protection may be made selectable. A switch contact may be further wired in a series with diodes and be selectively operable between a closed position to dump the RF power upon a transmit attempt and an open position allowing both the transmit and receive operation of the radio.

The switch in the overload protection may be also configured to output a signal informing the controller of the intended use of the radio. This switch and the circuit may be integrated into the radio identifier and be provided as an adapter, as described above. The housing of the adapter may be designed with a rotating switch selector to either open or close switch contact.

A time delayed relay contact may be further wired in a series with diodes and be operable to open when the time delayed relay coil is energized by RF energy or deenergized by an absence or a conclusion of transmission of RF power after a transmit event based on a signal from a sensor that senses power level at the center pin of the antenna connector. This allows the controller time to disconnect radios attached to the same antenna and prevent receiver overload. Typical MEMS RF switches are capable of switching in under 100 microseconds or less.

Now in a reference to the drawings.

FIG. 1 illustrates a block diagram of an intelligent multiple antenna and radio interconnect optimizer (device) 30. The device 30 includes an antenna port 32, a radio port 34, a machine readable identifier 42, a radio frequency (RF) switch 80, and a controller 100. The machine readable identifier 42 may include any one of an RFID tag, a barcode and a circuit of FIGS. 2A-2B. Also shown are a sensor 44, such as an RFID reader or a barcode reader, and a sensor controller 46. The sensor controller may be an ohmmeter. The sensor controller may be a network analyzer. The sensor controller 46 is electrically connected to the controller 100.

FIG. 1 also illustrates antenna 2 with a cable 4 that terminates with antenna connector 6. A low noise amplifier (LNA) 8 is also shown. FIG. 1 also illustrates a radio 10 with a connector 12, a cable 14 that has two connectors 16 and 18.

FIG. 1 further illustrates an adapter 50 with a housing 52, a connector 54, a connector 56 and a shield 58.

FIG. 1 further illustrates a controller 100 with the one or more processors 102 and memory 104, a user interface 106, a housing 108. The controller 100 may be designed to interface with a remote control unit 109.

Figure 2A:
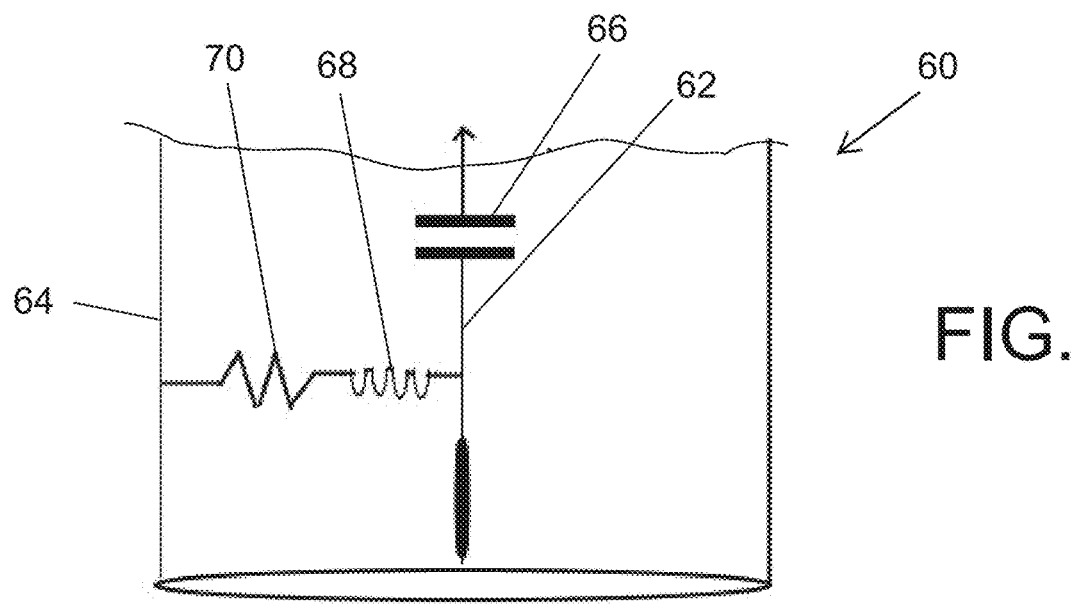
FIGS. 2A-2B illustrate machine readable identifier circuits.
Figure 2B:
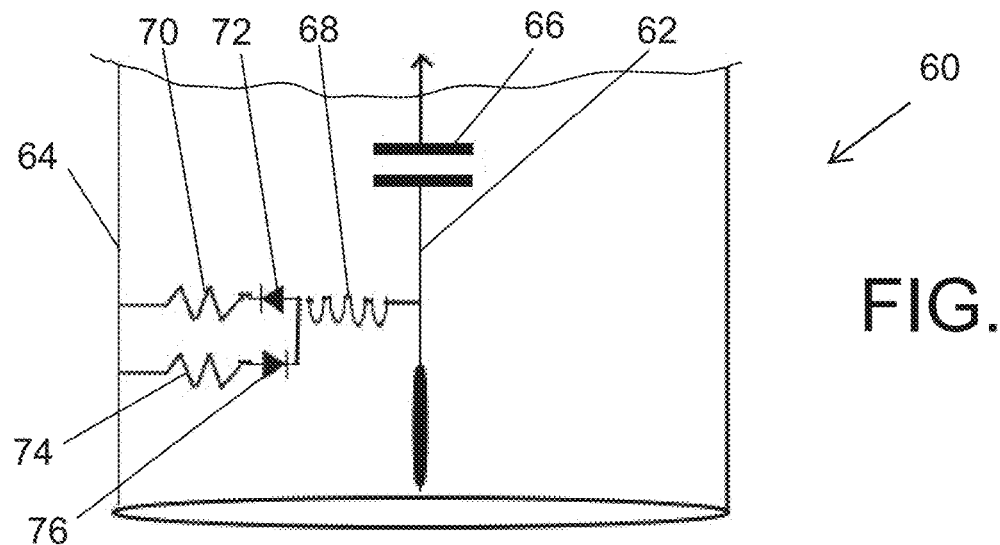

FIGS. 2A-2B illustrate a machine readable identifier designed as a circuit 60. The circuit 60 of FIG. 2A is designed with a capacitor 66, as a DC block, in a wire 62 connected to the center (RF) pin of the connector, a shield 64, a coil 69 and resistor 70 disposed in a series with the coil 69, as an RF choke. The circuit 60 of FIG. 2B is also designed with diodes 72 and 76 and a second resister 74 to offer two different resistor values, each associated with a different polarity, and offering more value combinations for identifying the associated antenna or radio.

Figure 3:
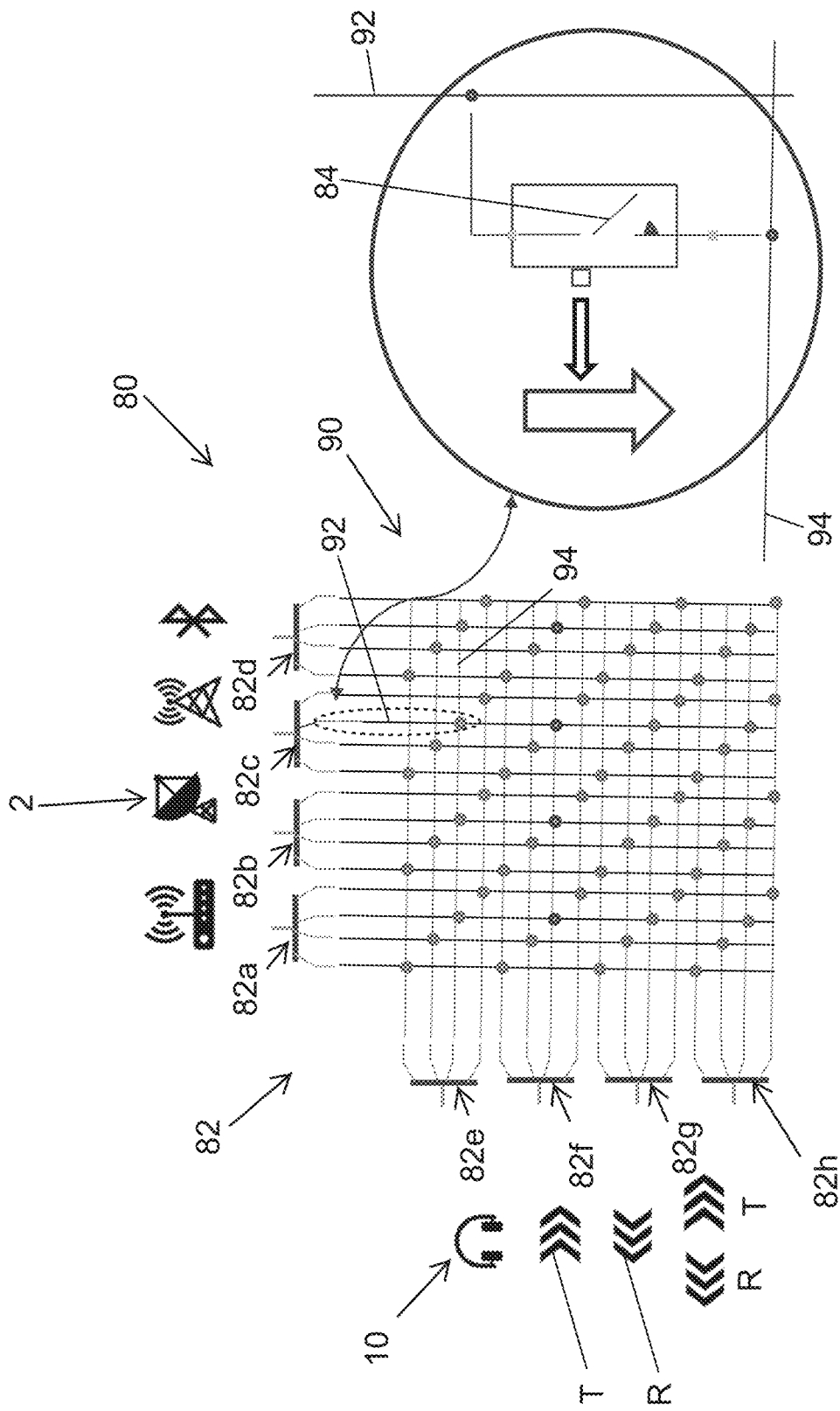
FIG. 3 illustrates a MEMS switch matrix.

FIG. 3 illustrates the RF switch 80 that is designed as a MEMS switch matrix with eight MEMS switches 82. Four MEMS switches 82, referenced with numerals 82a-82d are connected to four antenna ports 32. Four MEMS switches 82, referenced with numerals 82e-82h are connected to four radio ports 34. The radio 10 is illustrates in three operational modes: transmit T, receive R and receive/transmit R/T. FIG. 3 also illustrates that a contact 84 of the MEMS switch 82 is electrically coupled to the matrix grid represented by wires 92 and 94.

Figure 4:
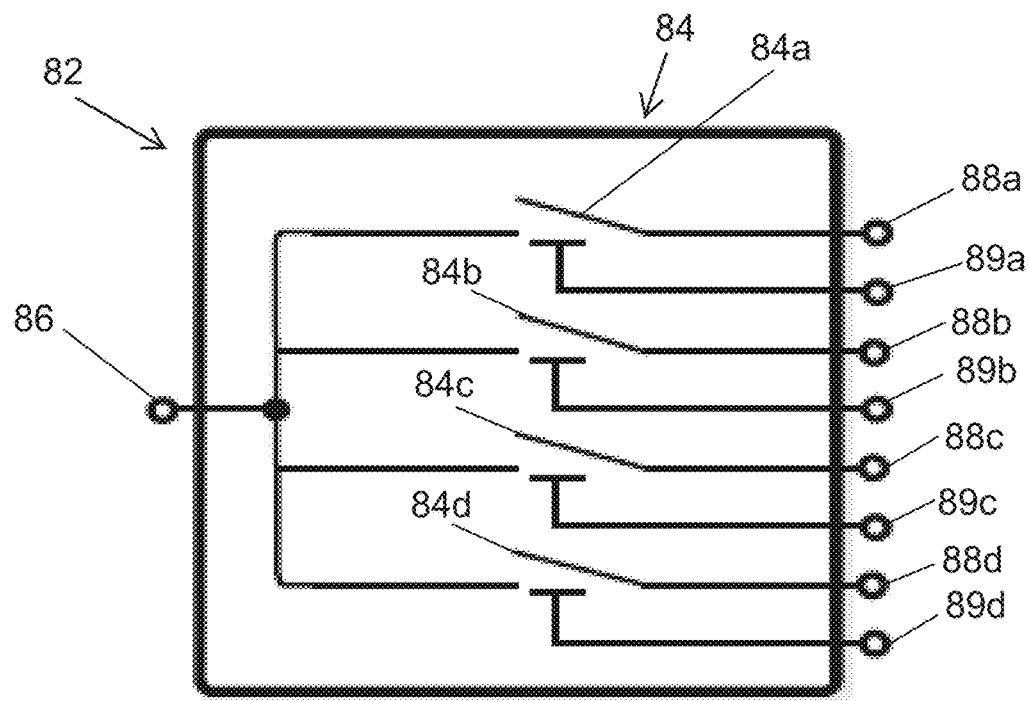
FIG. 4 illustrates functional block diagram of a MEMS switch that may be used within the intelligent multiple antenna and radio interconnect optimizer.

FIG. 4 illustrates functional block diagram of a MEMS switch 82 that may be obtained from Analog Devices under a model number ADGM1304. The exemplary MEMS switch 82 has four contacts 84a-84d and four bias gates 89a-89d. Each contact 84 has outputs, referenced as 88a-88d that are connected to a common input 86.

Figure 5:
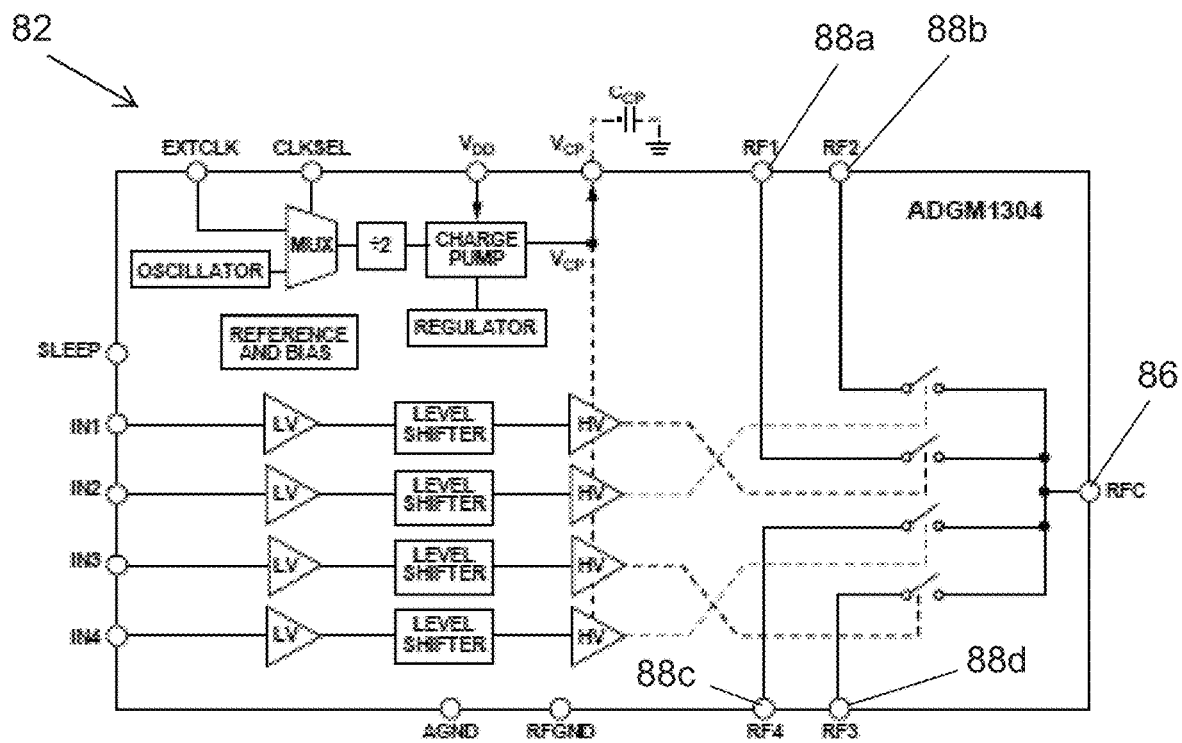
FIG. 5 illustrates a circuit diagram of a MEMS switch.

FIG. 5 illustrates a circuit diagram of a MEMS switch 82 of FIG. 4.

Figure 6C:
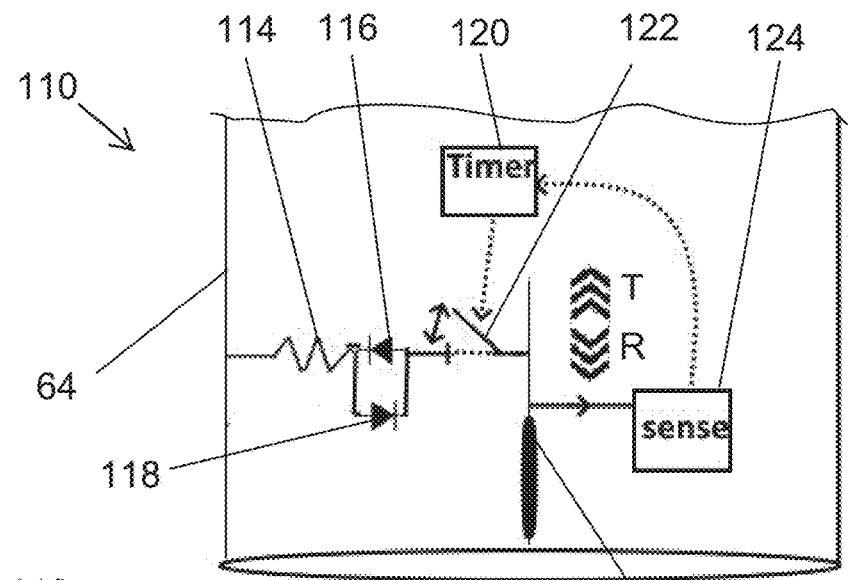
FIGS. 6A-6C illustrate RF power overload protection functional diagrams.
Figure 6B:
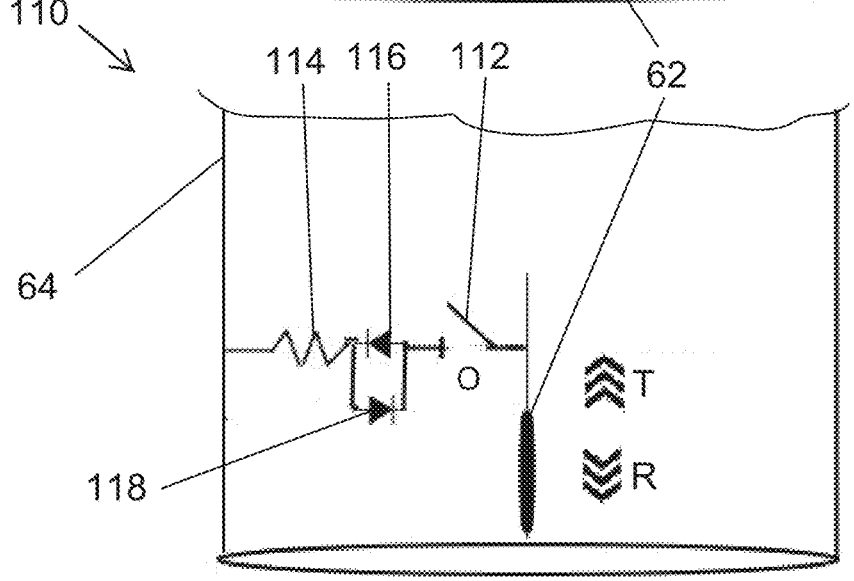
Figure 6A:
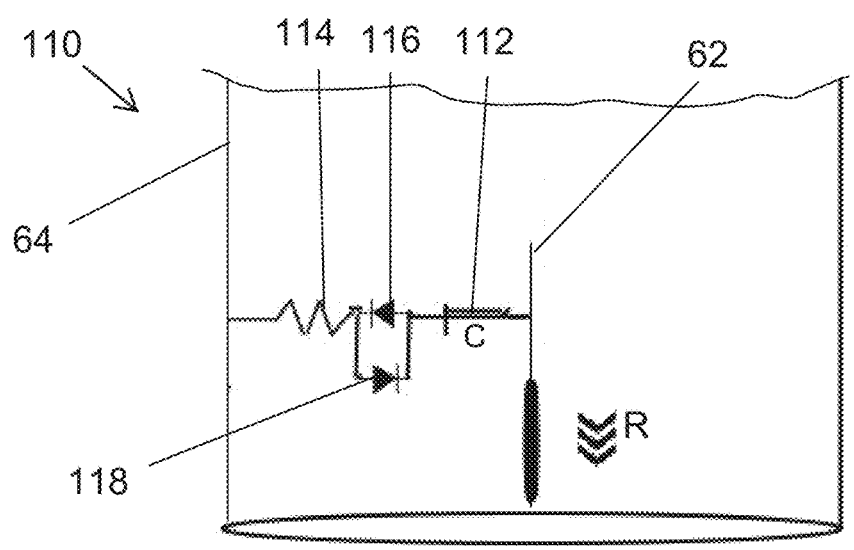

FIGS. 6A-6C illustrate RF power overload protection functional diagrams. FIG. 6 illustrates a switch contact 112 disposed in a closed state only allowing receive (R) operation. The switch contact 112 is electrically connected in series with diodes 116 and 118 and resister 114. Any power overload through the wire 62 connected to the center (RF) pin will be dumped to the shield 64. FIG. 6B illustrates the switch contact 112 being open and allowing receive (R) and transmit (T) operations of the radio 10. FIG. 6C illustrates a timer (time delayed relay) 120 coupled to the sensor 124 and designed to selectively open and close relay contact 122. The sensor 124 may be designed to sense power levels through the wire 62 connected to the center (RF) pin and output different feedback signals to the controller 100. The sensor 124 may sense that the transmit power level is approaching maximum threshold and open the relay contact 122. The relay contact 122 may open after a time delay that can be selected based on a fixed time giving the switch matrix time to disconnect any receivers from the same antenna used to transmit. The sensor 124 may then sense the absence of transmit power and reclose relay contact 122 and notify the switch matrix it is safe to reconnect radios also associated with the same antenna, thereby allowing receive to again occur on them.

Figure 7:
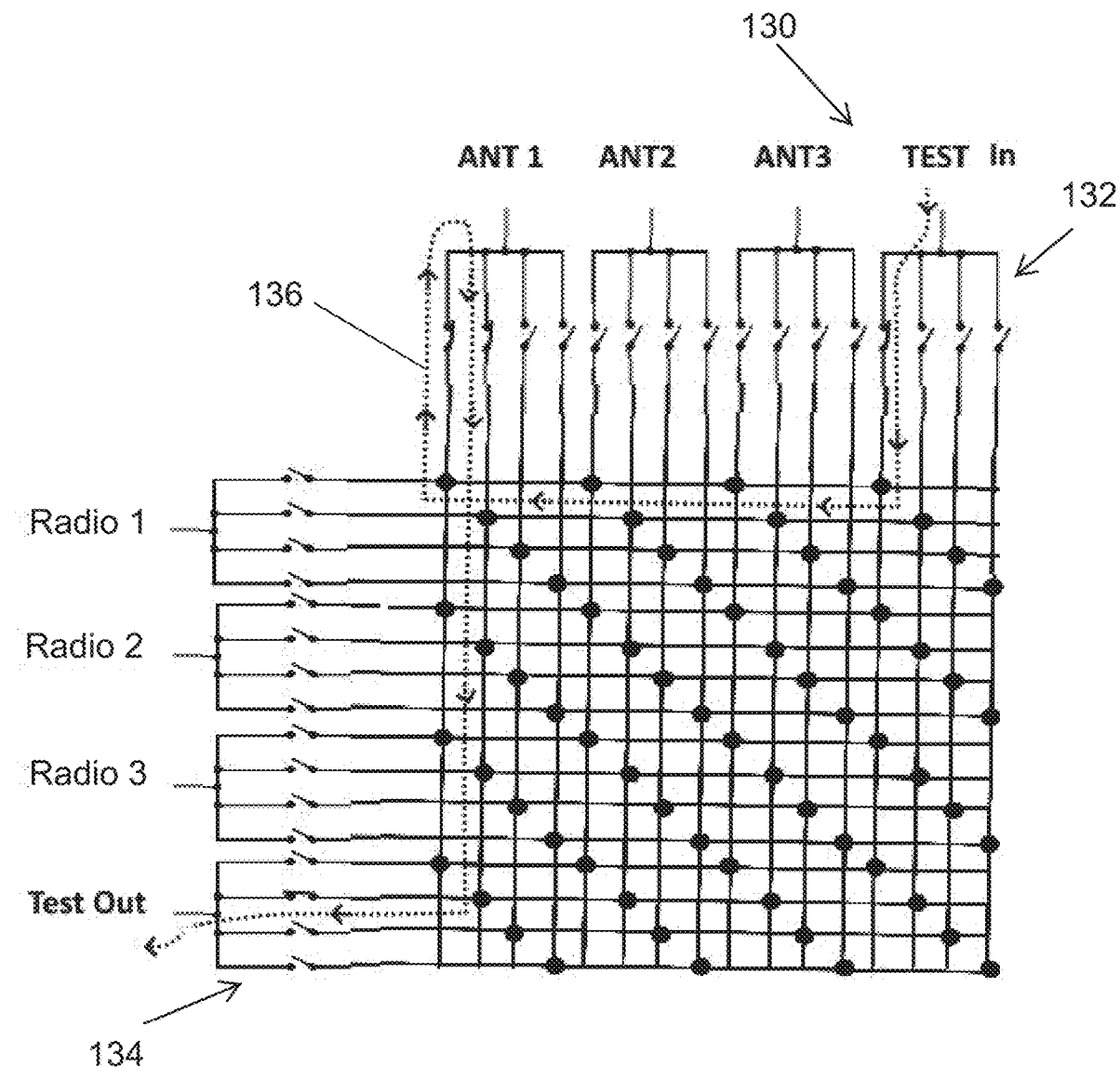
FIG. 7 illustrates an exemplary MEMS switch test circuit configuration.

FIG. 7 illustrates an exemplary MEMS switch test circuit 130. One of the test-dedicated MEMS switches, referenced with the numeral 132, may be selected as a test input switch and one of the the-dedicated MEMS switch, referenced with numeral 134, may be selected as a test output switch. Reference numeral 136 illustrates a current path of testing a pair of antenna switch contacts 84 with the controller 100.

Figure 8:
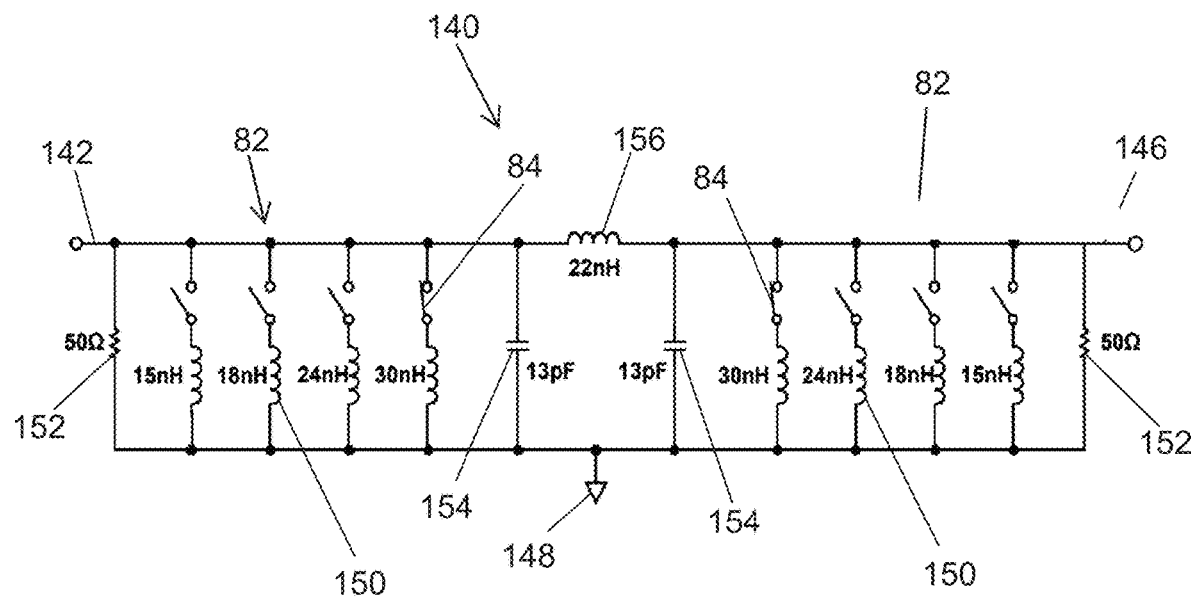
FIG. 8 illustrates a MEMS-based configurable pre-filter that can be used with intelligent multiple antenna and radio interconnect optimizer.

FIG. 8 illustrates a MEMS-based pre-filter 140 that can be used with intelligent multiple antenna and radio interconnect optimizer 30. Pre-filter includes MEMS switches 82 that are connected to pre-filter input 142, pre-filter output 146 and ground 148. Coils 150, 152 and 156 and capacitors 154 are also provided. Illustrated coil and capacitor values are exemplary and will be modified based on the band frequencies to be passed through each contact 84. Coil values may be identical to each other. One of the contacts 84 is shown in a closed state to select a particular frequency bandwidth.

Figure 9:
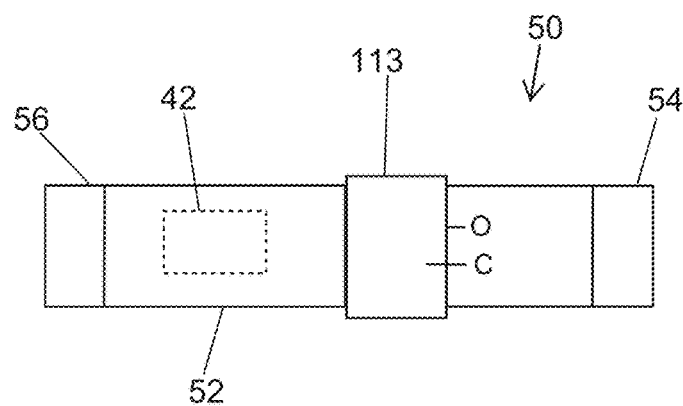
FIG. 9 illustrates a block diagram of an adapter that may be used to identify the antenna and/or radio.

FIG. 9 illustrates a block diagram of the adapter 50 of FIG. 1 that may be designed with a rotatable switch 113 to select either an open "O" or closed "C" state of the switch contact 112.

Figure 10:
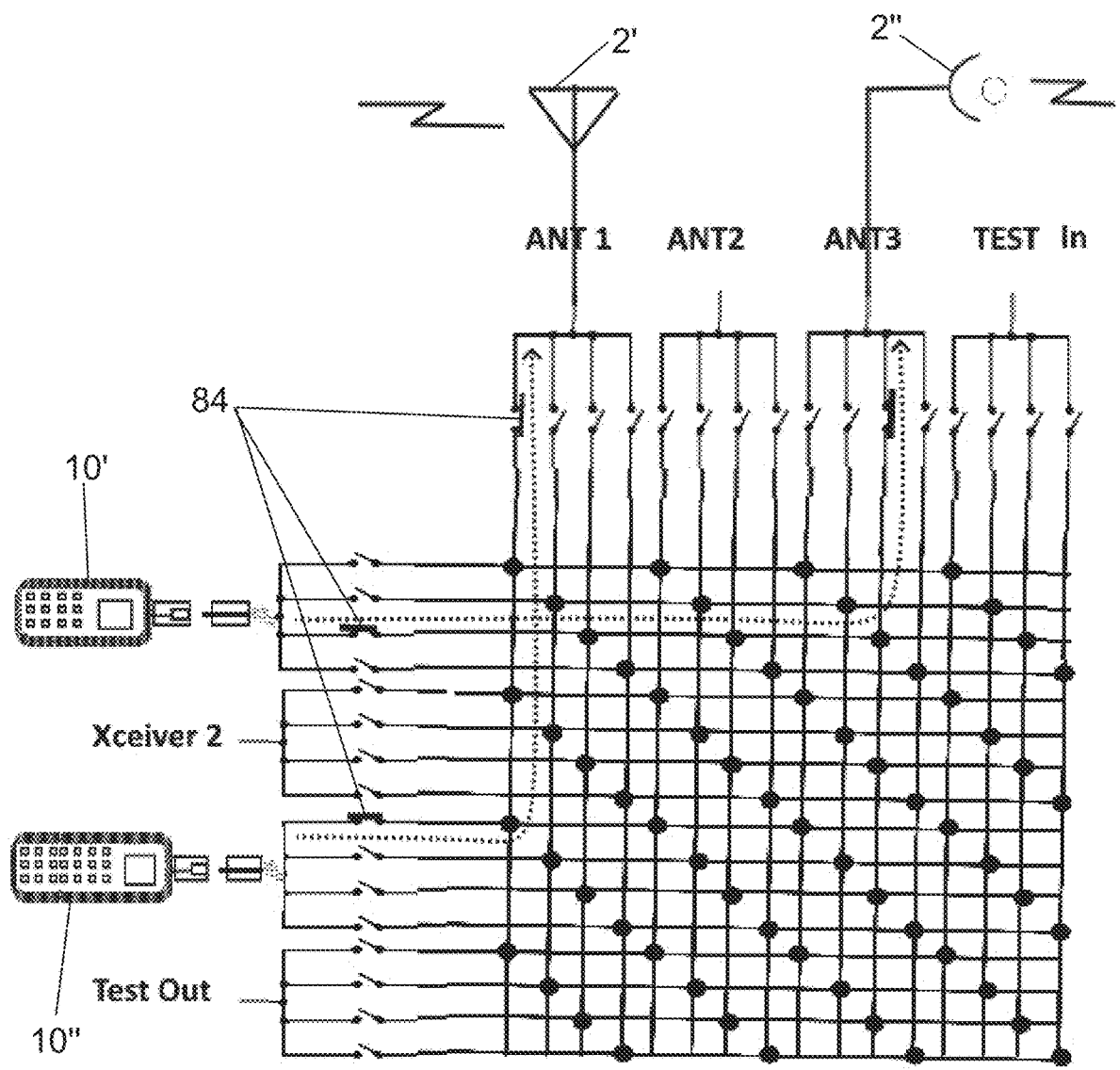
FIG. 10 illustrates exemplary connections between radios and antennas.

FIG. 10 illustrates an exemplary connection between two radios 10', 10" and two antennas 2', 2", where appropriate contacts 84 are in a closed state.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded and rounded angles may be sharp. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

What is claimed is:

1. A device, comprising:
   an antenna port comprising a radio frequency (RF) connector for a connection to an RF antenna;
   a radio port comprising an RF connector for a connection to a radio;
   a machine readable identifier coupled to one of the antenna port, the radio port and a combination thereof, the machine readable identifier comprises a housing, two RF connectors accessible from an exterior surface of the housing, and a radio frequency identification (RFID) tag mounted on the exterior surface of the housing or within a hollow interior of the housing, one of the two RF connectors in the machine readable identifier connectable to a cable extending from the RF antenna or the cable extending from the radio, the machine readable identifier suitable to identify a feature in one of the radio being connected to the radio port and the RF antenna being connected to the antenna port;
   a sensor designed to sense information in the machine readable identifier;
   a sensor controller electrically connected to the sensor;
   an RF switch configured to enable RF communication between the antenna port and the radio port in a response to a control signal; and
   a controller electrically connected to each of the sensor controller and the RF switch, the controller designed to receive the information from the sensor controller, the controller being further designed to output the control signal in a response to received information.

2. The device of claim 1, wherein the RF switch comprises RF microelectromechanical system (MEMS) matrix.

3. The device of claim 1, wherein the machine readable identifier comprises a radio frequency identification (RFID) tag, wherein the sensor comprises an RFID reader and wherein the sensor controller comprises an RFID reader controller.

4. The device of claim 1, wherein the machine readable identifier comprises a radio frequency identification (RFID) tag coupled to the RF antenna being connected to the antenna port, wherein the sensor comprises an RFID reader and wherein the sensor controller comprises an RFID reader controller.

5. The device of claim 1, wherein the antenna port comprises an RF connector and wherein the sensor comprises a radio frequency identification (RFID) reader positioned adjacent the RF connector.

6. The device of claim 1, wherein the radio port comprises an RF connector and wherein the sensor comprises a radio frequency identification (RFID) reader positioned adjacent the RF connector.

7. The device of claim 1, wherein the machine readable identifier comprises a barcode, wherein the sensor comprises a barcode reader and the sensor controller comprises a barcode controller.

8. The device of claim 1, wherein the sensor comprises a network analyzer suitable to identify the RF antenna being connected to the antenna port and/or antenna characteristics.

9. The device of claim 1, wherein the feature comprises one of a frequency, a power level of the RF antenna, a bandwidth, a gain, a polarization, an RF antenna type, and any combinations thereof.

10. The device of claim 1, further comprising a low noise amplifier (LNA) mounted at the antenna port and/or connected to the RF switch and selected by the controller to boost an RF signal.

11. The device of claim 1, further comprising a filter mounted at the antenna port and/or connected to the RF switch, the filter configured to allow insertion and selection of different frequency filters.

12. The device of claim 11, wherein the filter comprises one of a band-pass filter, a lowpass filter, a highpass filter, and a notch filter.

13. The device of claim 1, further comprising a protection on the antenna port to protect the device from lightening and/or voltage surges.

14. The device of claim 1, further comprising a remote controller being one of an RF-based and an infrared-based.

15. The device of claim 1, further comprising:
   a housing;
   two RF connectors accessible from an exterior surface of the housing; and
   an RF identifier mounted on the exterior surface of the housing or within a hollow interior of the housing.

16. The device of claim 1, further comprising an antenna assembly, the antenna assembly comprising:
   the RF antenna;
   a cable extending from the RF antenna;
   an RF connector secured to a distal end of the cable in an electrical connection with the RF antenna; and
   an antenna identifier.

17. A device, comprising:
   an antenna port comprising a radio frequency (RF) connector configured to be connected to an RF antenna;
   a radio port comprising an RF connector configured to be connected to a radio;
   a machine readable identifier coupled to one of the antenna port, the radio port and a combination thereof, the machine readable identifier comprising:
      a first wire having one end thereof being attached to a shield of an RF connector in the antenna port and a second end thereof being connectable to the RF antenna,
      a second wire having one end thereof being attached to a center RF pin of the RF connector in the antenna port and a second end thereof being connectable to the RF antenna,
      a capacitor disposed within the second wire,
      a resistor electrically connected to each of the first and second wires, a value of the resistor being selected to match a unique RF antenna, and
      a coil electrically connected, in a series with a resistor, to each of the first and second wires,
      the machine readable identifier configured to identify a feature in the RF antenna connected to the antenna port;
   a sensor designed to sense information in the machine readable identifier;
   a sensor controller electrically connected to the sensor;
   an RF switch configured to enable RF communication between the antenna port and the radio port in a response to a control signal when a feature in the radio matches a feature in the RF antenna; and
   a controller electrically connected to each of the sensor controller and the RF switch, the controller designed to receive the information from the sensor controller, the controller being further designed to output the control signal in a response to received information.

18. The device of claim 17, wherein the sensor comprises a meter configured to measure a direct current (DC) resistance of the machine readable identifier.

19. A portable device, comprising:
a housing;
a plurality of radio frequency (RF) antenna connectors mounted for access from an exterior surface of the housing, each RF antenna connector configured to be connected to an RF antenna;
a plurality of RF radio connectors mounted for access from the exterior surface of the housing, each RF radio connector configured to be connected to a radio;
a plurality of sensors, each sensor from the plurality of sensors disposed at the each RF antenna connector and at the each RF radio connector, the each sensor designed to read information in a machine readable identifier of the RF antenna connected to a respective RF antenna connector and the machine readable identifier of the radio connected to a respective RF radio connector, wherein the machine readable identifier comprises a radio frequency identification (RFID) tag;
an RF switch disposed within a hollow interior of the housing, the RF switch comprising a plurality of multi-contact switches, each multi-contact switch is coupled to the each RF antenna connectors and the each RF radio connector, each pole in a multi-contact switch connected to the each RF radio connector is coupled to one contact in each multi-contact switch connected to the each RF antenna connector, each pole in the multi-contact switch connected to the each RF antenna connector is coupled to one pole in each multi-contact switch connected to the each RF radio connector, the RF switch configured to selectively enable an RF communication between an RF antenna port from a plurality of RF antenna ports and an RF radio port from a plurality of RF radio ports in a response to a control signal; and
a controller disposed within the hollow interior of the housing, the controller electrically connected to the plurality of sensors and to the RF switch, the controller configured to output the control signal in a response to received information from the plurality of sensors and radio and port locations, when a feature in the information from the radio matches a feature in the information from the RF antenna.

* * * * *